INVENTORS
Stewart A. Claypoole
Martin M. Mertsoc
BY Walter S. Zaborski
ATTORNEY

United States Patent Office 3,439,395

Patented Apr. 22, 1969

3,439,395

METHOD OF ATTACHING LEADS TO ELECTRICAL COMPONENTS

Stewart A. Claypoole, Painted Post, and Martin M. Mertsoc, Corning, N.Y., assignors to Corning Glass Works, Corning, N.Y., a corporation of New York Filed Nov. 5, 1965, Ser. No. 506,510

Int. Cl. H01g *13/00;* H01r *43/00*

U.S. Cl. 29—25.42 6 Claims

ABSTRACT OF THE DISCLOSURE

A method of attaching a lead to an electrical component, such as an electrical capacitor, by first applying a metallic coating to the end of the component, then applying a conductive fusible material to the back of a U-shaped terminal on a wire lead, and finally simultaneously bonding the fusible material to the terminal and the conductive coating by passing current through the terminal to produce heat.

For simplicity, the present invention shall be described in terms of attaching leads to a stacked capacitor the preferred embodiment, however, it is to be clearly understood that this invention is in no way limited to capacitors.

As is known in the art, stacked capacitors consist of alternate layers of conductive plates such as metallic foils, sheets, or films, and dielectric material such as glass. Alternative conductive plates extend to or project slightly beyond end of the dielectric layers while the remaining plates extend to or project slightly beyond the other end of the dielectric layers. One lead is attached to each end of the capacitor in contact with one set of capacitor plates. The capacitors are then encased within some dielectric material so that only the leads project beyond the case body.

Heretofore, leads have been attached to such capacitors directly by means of soft solder, resistance welding, conductive frit and the like. Such methods have proved unsatisfactory since the leads did not have a strong mechanical bond to the capacitor, did not provide good electrical continuity between the leads and the plates, required the plates to extend beyond the ends of the capacitor element, or the like.

The objects of the present invention are to provide an economical method of attaching leads to electrical components so that the leads have a strong mechanical bond to the component body and so that there is good electrical continuity between the leads and the component element.

Broadly according to this invention leads may be attached to an electrical component by providing a lead assembly having a wire lead and a U-shaped terminal at one end thereof with the enclosed portion of the terminal extending away from the wire lead, applying a fusible bonding medium to the back surface of the enclosed portion of said terminal, applying a metallic coating to the end of the electrical component in electrical contact with the end of the electrical element, disposing the terminal about the end of the electrical component with the fusible bonding medium in contact with the metallic coating, and thereafter heating the terminal by passing electrical energy therethrough thereby fusibly uniting the terminal to the component end.

Additional objects, features, and advantages of the present invention will become apparent to those skilled in the art, from the following detailed description and the attached drawing on which, by way of example, only the preferred embodiments of this invention are illustrated.

Figure 1:
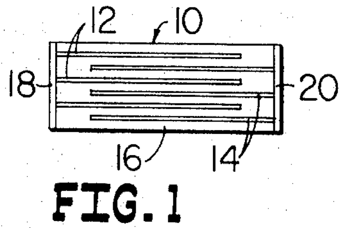
FIGURE 1 is a side elevation of a capacitor body, to the ends of which a metallic film has been applied.

Referring to FIGURE 1, a stacked capacitor body 10 is shown having two sets of capacitor plates 12 and 14 embedded in a mass of glass dielectric material 16. Such a capacitor body may be formed by assembling alternate layers of metallic foil and thin sheets of glass, and thereafter fusing the assembly to form a monolithic structure. Capacitor plates 12 extend to one end of body 10 while plates 14 extend to the other end. A metallic film 18 is applied to one end of the capacitor body in electrical contact with capacitor plates 12. Metallic film 20 is applied to the other end of the capacitor body in electrical contact with capacitor plates 14.

Suitable metallic films may be formed of silver, gold, platinum, silver-rhodium, palladium, or the like and may be applied by painting, dipping silk screening, spraying, evaporating or the like. A particularly suitable material is a silver-rhodium resinate having 22.5 percent by weight silver and 0.15 percent by weight rhodium.

Figure 2:
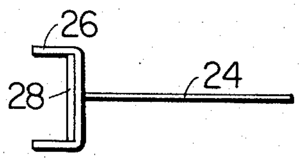
FIGURE 2 is a side elevation of a coated lead assembly of the present invention.

A lead assembly having a wire lead 24 and a U-shaped terminal 26 at one end of lead 24, is formed as shown in FIGURE 2. The wire lead is attached to the back portion of the U so that the enclosed portion of terminal 26 extends away from lead 24. A coating 28, of a fusible bonding medium, is applied to the back surface of the enclosed portion. The bonding medium may be a solder, conductive frit, or the like.

A conductive frit is applied as a slurry and is thereafter dried. Such a frit consists of a glass binder mixed intimately with silver particles. A slurry that has particular utility for this invention is one that has a binder particle size such that the particles pass through a 200 mesh screen. The solid constituents have 50 to 90 percent by weight of silver and 10 to 50 percent by weight of fritted glass of the type shown in Example 1 of Table 1. To form a slurry, about one gram of an organic vehicle such as nitro cellulose amyl acetate solution, turpentine, or the like is added to about 2 to 6 grams of solid constituents. Examples of suitable glass compositions are shown in Table 1 in weight percent.

TABLE 1

| | Examples | | |
|---|---|---|---|
| | 1 | 2 | 3 |
| $SiO_2$ | 5 | 15 | 3 |
| $Al_2O$ | 5 | 10 | 11 |
| $B_2O_3$ | 30 | 30 | 11 |
| PbO | 60 | 45 | 75 |

Suitable materials for the wire lead are iron-nickel alloys such as Dumet or Kovar, while the terminal can also be formed of iron-nickel alloys such as 54 percent iron and 46 percent nickel.

Figures 3, 4:
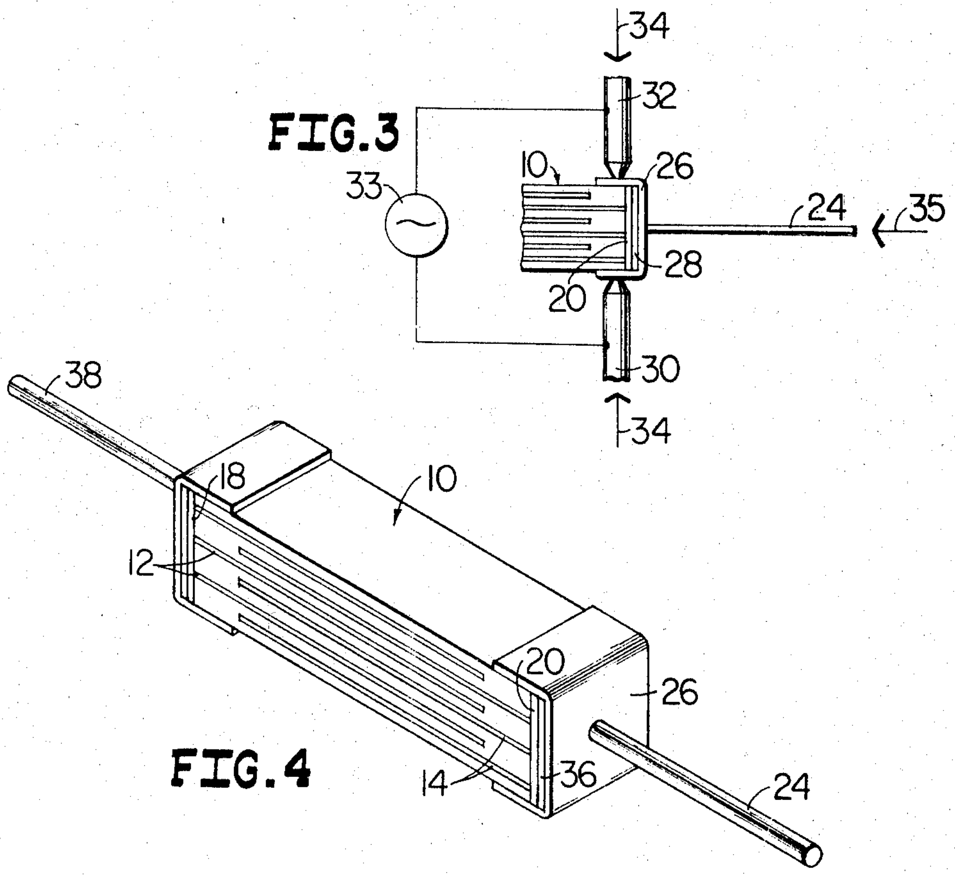
FIGURE 3 is a side elevation of a stacked capacitor, to the end of which a lead assembly is being attached in accordance with the present invention.
FIGURE 4 is an oblique view illustrating a capacitor having leads attached according to the present invention.

Referring now to FIGURE 3, the lead assembly of FIGURE 2 is disposed over the coated end of capacitor body 10 such that the back surface of the terminal coated with the fusible bonding medium contacts the metallic film on the end of the capacitor body. The assembly so formed is then placed between a pair of electrodes 30 and 32 which are connected to a suitable source of electrical energy 33. A force is applied to the assembly by the electrodes in the direction of arrows 34 and a force is also applied along the longitudinal axis in the direction of arrow 35 to keep the fusible bonding medium in contact with the metallic film as current passes through the terminal. The terminal is thus heated causing the fusible bonding medium to fuse to the metallic coating.

The completed capacitor is shown in FIGURE 4. Terminal 26 is shown fused to capacitor body 10 and there is good electrical contact between lead 24 and plates 14 through terminal 26, fused bonding medium 36, and metallic coating 20. Lead 38 is similarly attached to the other end of the capacitor.

Figure 5:
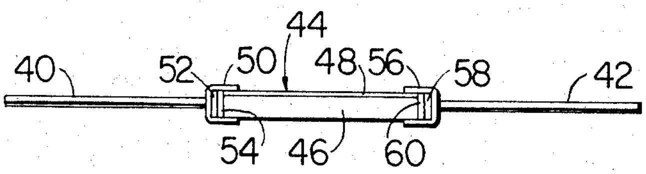
FIGURE 5 is a side elevation of a resistor to which leads have been attached in accordance with the present invention.

FIGURE 5 illustrates another embodiment of this invention. Leads 40 and 42 are attached to a thin film resistor 44. Resistor 44 comprises a dielectric substrate 46 and a resistance film 48. Lead 40 is attached by means of terminal 50 through fused bonding medium 52 and metallic film 54, while lead 42 is attached by means of terminal 56 through fused bonding medium 58 and metallic film 60.

A typical example of the present invention is illustrated by the following. A stacked capacitor is formed by assembling alternate layers of metallic foil and thin sheets of glass, and thereafter fusing the assembly to form a monolithic structure. One set of capacitor plates extends to one end of the capacitor while the other set extends to the other end.

A film of silver-rhodium resinate having 22.5 percent by weight silver and 0.15 percent by weight rhodium was applied to the ends of the capacitor. The film was thereafter dried and fired forming a metallic coating over each end of the capacitor in electrical contact with each respective set of plates.

A conductive frit composed of 3 parts by weight of finely divided solid constituents and one part by weight of nitro cellulose amyl acetate solution was then formed. The solid constituents were composed of 70 percent by weight of silver and 30 percent by weight of glass consisting by weight of about 15 percent $SiO_2$, 10 percent $Al_2O_3$, 30 percent $B_2O_3$, and 45 percent PbO.

A lead assembly was provided having a wire lead and a U-shaped terminal attached to the end thereof with the enclosed portion of the terminal extending away from the lead. A coating of the conductive frit was applied to the back surface of the enclosed surfaces of the terminal and thereafter dried. The terminal was formed of an alloy of 54 percent iron and 46 percent nickel.

The terminal was placed over one end of the capacitor with the conductive frit on the terminal in contact with the metallic film on one end of the capacitor. A pair of electrodes were brought into contact with the legs of the U-shaped terminal and electrical energy was passed therethrough thereby heating the terminal and fusing the conductive frit to the metallic coating and the terminal.

It was found that the capacitor had leads strongly bonded to the capacitor body and that there was good electrical continuity between the leads and the component.

It should also be noted that the fusible bonding medium may be applied to both the enclosed surfaces of the terminal as well as over the metallized end of the electrical component when desired. The fusible bonding medium may be applied to all of the surfaces of the enclosed portion of the terminal rather than the back surface alone.

Although the present invention has been described with respect to specific details of certain embodiments thereof, it is not intended that such details be limitations upon the scope of the invention except insofar as set forth in the following claims.

We claim:

1. A method of attaching a lead to a stacked capacitor body having at least two capacitor plates embedded in a dielectric, one of said plates extending to one end of the capacitor body with the other extending to the other end thereof, comprising the steps of:
- applying a metallic coating to one end of said capacitor body in electrical contact with one of said plates,
- forming a lead assembly having a wire lead and a U-shaped terminal at one end thereof with the enclosed portion of said terminal extending away from said lead,
- applying a conductive fusible bonding medium to the back enclosed surface of said terminal,
- disposing said terminal about the coated end of said capacitor with said bonding medium in contact with the metallic coating, and
- heating said terminal by passing electrical energy therethrough thereby simultaneously fusing said bonding medium to said metallic coating and said terminal, and bonding said lead assembly to said capacitor body.

2. The method of claim 1 further comprising the step of firing the metallic coating before the fusible bonding medium is fused thereto and to the terminal.

3. The method of claim 1 wherein the fusible bonding medium is a conductive frit.

4. The method of claim 3 wherein the conductive frit comprises 50 to 90 percent by weight of silver and 10 to 50 percent by weight of glass.

5. The method of claim 4 wherein said glass consists essentially by weight of about 15 percent $SiO_2$, 10 percent $Al_2O_3$, 30 percent $B_2O_3$ and 45 percent PbO.

6. A method of attaching a lead to an electrical component comprising the steps of:
- providing an electrical element,
- applying a metallic coating to one end of said element in electrical contact therewith,
- forming a lead assembly having a lead wire and a U-shaped terminal at one end thereof with the enclosed portion of said terminal extending away from said lead,
- applying a conductive fusible bonding medium to the back enclosed surface of said terminal,
- disposing said terminal about the coated end of said element with said bonding medium in contact with the metallic coating, and
- heating said terminal by passing electrical energy therethrough thereby simultaneously fusing said bonding medium to said metallic coating and said terminal, and bonding said lead assembly to said element.

References Cited

UNITED STATES PATENTS

| | | | |
|---|---|---|---|
| 2,395,442 | 2/1946 | Ballard | 317—261 X |
| 2,704,880 | 3/1955 | Brennan | 317—242 X |
| 3,218,528 | 11/1965 | Heidler | 317—261 X |
| 3,300,677 | 1/1967 | Karol et al. | |
| 3,307,134 | 2/1967 | Griest. | |

JOHN F. CAMPBELL, *Primary Examiner.*

R. B. LAZARUS, *Assistant Examiner.*

U.S. Cl. X.R.

29—628

U.S. DEPARTMENT OF COMMERCE
PATENT OFFICE
Washington, D.C. 20231

UNITED STATES PATENT OFFICE

CERTIFICATE OF CORRECTION

Patent No. 3,439,395 April 22, 1969

Stewart A. Claypoole et al.

It is certified that error appears in the above identified patent and that said Letters Patent are hereby corrected as shown below:

Column 1, line 31, before "end" insert -- one --. Column 2, line 52, "$Al_2O$" should read -- $Al_2O_3$ --. Column 4, line 3, "with" should read -- while --.

Signed and sealed this 14th day of April 1970.

(SEAL)
Attest:

Edward M. Fletcher, Jr.
Attesting Officer

WILLIAM E. SCHUYLER, JR.
Commissioner of Patents